United States Patent [19]

Chekhov et al.

[11] 4,179,487
[45] Dec. 18, 1979

[54] CONTACT APPARATUS FOR CARRYING OUT HEAT-AND-MASS EXCHANGE PROCESSES

[76] Inventors: Oleg S. Chekhov, Leninsky prospekt, 152, kv. 77; Alexandr G. Rybinsky, ulitsa Geroev Panfilovtsev, 1, korpus 5, kv. 84, both of Moscow; Anatoly B. Tjutjunnikov, ulitsa Frunze, 17, kv. 34, Kharkov; Gennady P. Solomakha, ulitsa Pervomaiskaya, 56, kv. 25, Moskovskaya oblast, Dolgoprudny; Viktor V. Dilman, ulitsa Kravchenko, 4, korpus 2, kv. 6, Moscow, all of U.S.S.R.

[21] Appl. No.: 894,083

[22] Filed: Apr. 4, 1978

[51] Int. Cl.² .............................................. B01F 3/04
[52] U.S. Cl. ................................ 261/114 R; 202/158
[58] Field of Search ...................... 261/97, 110, 114 R, 261/DIG. 44; 202/158

[56] References Cited

U.S. PATENT DOCUMENTS

| | | | |
|---|---|---|---|
| 1,899,409 | 2/1933 | Bottoms | 261/114 R |
| 2,206,507 | 7/1940 | Kuhni | 261/114 R X |
| 2,804,935 | 9/1957 | Hutchinson | 261/114 R X |
| 2,973,189 | 2/1961 | Chu | 261/114 R |
| 3,162,700 | 12/1964 | Irons | 261/114 R |
| 4,036,918 | 7/1977 | Morgan et al. | 261/114 R |
| 4,060,399 | 11/1977 | Gleason | 261/114 R X |

FOREIGN PATENT DOCUMENTS

421331 9/1974 U.S.S.R. ............................. 261/114 R

Primary Examiner—Richard L. Chiesa
Attorney, Agent, or Firm—Steinberg & Blake

[57] ABSTRACT

The contact apparatus comprises a perforated base provided with at least one liquid overflow device, and two baffles, the ports of the base being for gas (steam) to pass. The overflow device is in fact two coaxial shells of which the top (as along the flow of liquid) partly encloses the bottom one, and is made up by two shell pieces interconnected by a guide member. The bottom shell piece has smaller flow passage area than the top one. The lower edge of the guide member is located above the upper end of the bottom shell. Each of the baffles is situated under the shell so to make a certain clearance with the lower end of the respective shell. The present invention can find utility when applied in fractionating and absorption columns for processes proceeding under heavy loads in terms of liquid processed, e.g., for purifying converted gas from carbon monoxide and dioxide by various absorbents, as well as for processes for absorbing nitrogen oxides with water in producing weak nitric acid.

8 Claims, 5 Drawing Figures

CONTACT APPARATUS FOR CARRYING OUT HEAT-AND-MASS EXCHANGE PROCESSES

The present invention relates generally to apparatus for carrying out heat-and-mass exchange processes proceeding in a gas (steam)-liquid system and more specifically, to contact apparatus of the character set for hereinbefore.

The invention can find most utility when applied in fractionating and absorption columns for processing running under heavy loads in terms of liquid processed, e.g., for purifying converted gas from carbon monoxide and dioxide by various absorbents, as well as for processes for absorbing nitrogen oxides by water in producing weak nitric acid.

One of the main trends in operating modern apparatus for carrying out heat-and-mass exchange processes proceeding between gas (steam) and liquid, resides in higher pressure in such apparatus which results in higher loads thereupon in terms of liquid processed. That is why the up-to-date apparatus for carrying out heat-and-mass exchange processes should meet the requirements of ensuring higher throughput capacity in terms of liquid.

One prior-art contact apparatus for carrying out heat-and-mass exchange processes is known to comprise a perforated base whose ports are adapted for gas (steam) to pass, provided with liquid overflow devices, each having rectangular cross-section. When said contact apparatus is applied in a column the overflow devices are arranged on each base parallel to one another and make up an angle of 90° with the adjacent bases. Such a contact apparatus features but a comparatively low efficiency when used in separation process by absorption and fractionation techniques, low throughput capacity in terms of liquid, narrow range of stable operation and local downfall of the liquid in places where it is fed from the overflow device onto the base of the subjacent contact apparatus which effects adversely the gas-and-liquid interaction conditions.

Another contact apparatus for gas (steam)-and-liquid interaction is known to comprise a perforated base whose ports are for gas (steam) to pass, provided with at least one overflow device which is in effect a cylindrical sleeve with its top end held to the perforated base, whereas spaced somewhat apart from the bottom end of the sleeve to form an annular gap, is a baffle shaped as a flat disk.

It is common knowledge that good deaeration in the overflow device adds to the liquid throughput capacity of a contact apparatus.

However, the known contact apparatus feature an inadequate deaeration due to too small an area of the inlet port which might result in its flooding and, eventually, in failure of the contact apparatus as a whole.

Inasmuch as the overflow device has only one annular gap which is as low as 15 mm, this results in too narrow a range of stable operation of the contact apparatus in terms of liquid. It is due to formation of a single annular liquid flow in the intertray column space that an incomplete separation of phases occurs which leads to equalizing the concentrations of liquid and, consequently, to a reduced efficiency of the column, wherein the afore-discussed contact apparatus are made use of.

One more contact apparatus is known in the art for carrying heat-and-mass exchange processes running in a system of gas (steam)-liquid, said known apparatus comprising a perforated base provided with at least one liquid overflow device, while the ports of the base are for gas (steam) to pass. The overflow device is made as two coaxial sleeves of which the top one (as along the flow of liquid) partly encloses the bottom sleeve, both of said sleeves having circular cross-section. Provided under each of the sleeves at a certain clearance with the lower end of a respective sleeve is a baffle establishing an annular gap for the liquid to flow out therethrough, said baffle being shaped as a flat disk.

The contact apparatus discussed above proves to be more efficient as compared to those described hereinbefore, due to the provision of additional zones of contact of the phases.

The top sleeve accommodates a funnel-shaped guide member arranged coaxially thereto, the major base of said member facing the direction opposite to that of the flow of liquid. Provision of such a guide member extends the range of stable operation of the contact apparatus as a whole due to a consecutive bringing into operation of the annular gaps of the overflow device.

Within the initial period of operation of the overflow device liquid flows out from the bottom annular gap. As the amount of load in terms of liquid increases the liquid level in the bottom sleeve is raised so that when the liquid reaches its upper end to escape from the top annular gap.

The disadvantages of the apparatus discussed above reside in a poor liquid deaeration in the overflow device and, as a result, relatively low liquid throughput capacity, as well as in local downfall of liquid occurring in the places where it is fed onto a subjacent perforated base. A reduced liquid throughput capacity of the known contact apparatus is accounted for by the presence of a funnel-shaped guide member which diminishes the flow passage area of the overflow device.

It is an object of the present invention to provide a contact apparatus for carrying out heat-and-mass exchange processes, which would feature high liquid throughput capacity.

It is another object of the present invention to increase the efficiency of a contact apparatus and extend the range of stable operation thereof.

In keeping with said and other objects the essence of the present invention resides in that a contact apparatus for carrying out heat-and-mass exchange processes proceeding in a gas (steam)-and-liquid system, comprises a perforated base whose ports are adapted for gas (steam) to pass, provided with at least one liquid overflow device which is shaped as two coaxial shells of which the top one, as along the flow liquid, partly encloses the bottom shell and is made up by two shell pieces interconnected through a guide member, the bottom shell piece having smaller flow passage area than the top one, and the lower edge of the guide member is situated above the upper end of the bottom shell, and two baffles of which one is located under the lower end of the bottom shell piece, while the other baffle is located under the lower end of the bottom shell.

According to the invention the liquid throughput capacity of the contact apparatus is enhanced due to provision of an increased deaeration surface area which results in a larger flow passage area of the liquid overflow device and reduced rate of ascending of deaeration gas bubbles, the latter ruling out the blocking of the overflow device passage area by the deaeration gas.

A satisfactory deaeration of liquid in the overflow device leads to a better liquid escaping from the annular gaps, whereby stable liquid films are formed in the intertray column space, which are in contact with the ascending steam or gas, thus adding to the efficiency of the contact apparatus as a whole.

Inasmuch as such a constructional arrangement of the contact apparatus increases a maximum liquid throughput capacity thereof due to a better aeration and improved liquid receiving conditions in the places of its feeding onto the subjacent perforated bases, this eventuates in an increased range of stable operation and efficiency of the contact apparatus.

It is admissible that the top shell piece, the bottom shell piece and the bottom shell be made each as a cylindrical sleeve.

It is also favourable that the top shell piece, the bottom shell piece and the bottom shell be made each as a rectangular duct.

Such a constructional feature of the shell pieces adds to the length of liquid downflow thereof as compared to shell pieces occupying the same area and made as cylindrical sleeves, which makes it possible to increase the liquid throughput capacity of the contact apparatus.

It is recommended that the baffle situated under the lower end of the bottom shell would make a clearance with the wall of the bottom shell for liquid to get within the area of the other baffle.

Such an embodiment of the contact apparatus adds to its liquid throughput capacity due to an increased flow passage area of the overflow device.

The bottom shell has a number of ports for liquid to pass, provided in the shell wall above the lower end of the bottom shell piece.

Said ports in the bottom shell wall establish a hydraulic lock above the top annular gap, i.e., prevent gas ingress through said gap, thus avoiding the blocking of the overflow device by the flow of gas.

In the case of a contact apparatus provided with at least two horizontal overflow devices, it is expedient that the perforated base would have a number of receiving troughs, each of them being spaced equidistantly between the adjacent overflow devices under the partition plate subdividing the perforated base into compartments, each accommodating the overflow device.

It is thanks to such a constructional arrangement that the flow of liquid onto the base of the contact apparatus and redistribution of liquid over the base are improved, whereby the efficiency of the contact apparatus and the range of its stable operation are increased. In addition, said troughs serve as supporting elements for the perforated base which simplifies the construction of the contact device.

Other objects and advantages of the present invention will become more obvious from a consideration of the following specific embodiments thereof to be taken with reference to the accompanying drawings, wherein.

Figure 1:
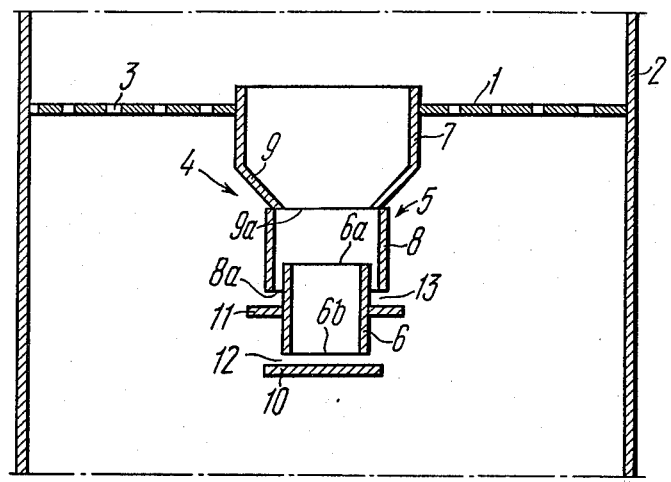
FIG. 1 is a schematic longitudinal-section view of a contact apparatus, according to the invention, featuring one overflow device.

The contact apparatus for carrying out heat-and-mass exchange processes running in a gas (steam)-and-liquid system, such as absorption of nitrogen oxides with water comprises according to the invention a perforated base 1 (FIG. 1) accommodated in a shell 2 and provided with, say, ports 3 for nitrous gas to pass, and with at least one liquid overflow device 4.

Figure 3:
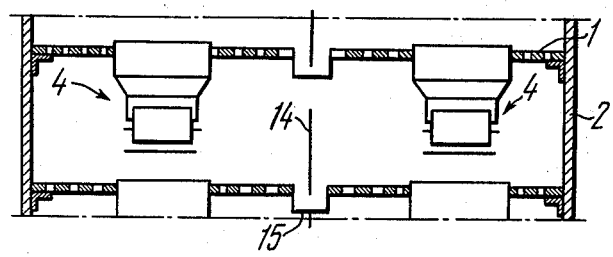
FIG. 3 is a contact apparatus, according to the invention, featuring sectionalizing partition plates and receiving troughs.
Figure 2:
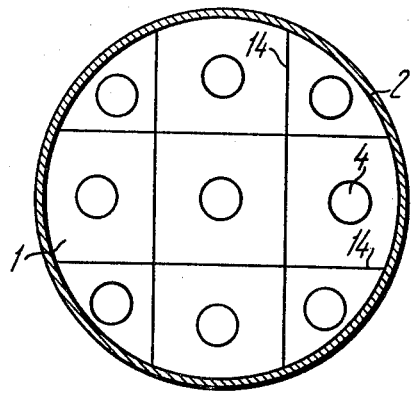
FIG. 2 is a plan view of a contact apparatus, according to the invention, incorporating nine overflow devices made as cylindrical sleeves, the ports for gas (steam) to pass being purposely not shown.

The overflow device 4 is mounted on the base 1 and is essentially made up by two coaxial shells 5 and 6. The top shell 5, as along the flow of liquid, partly encloses the bottom shell 6, and is composed of two shell pieces 7 and 8 coaxial to each other and interconnected through a guide member 9. The bottom shell piece 8 has smaller flow passage area than the top shell piece 7. The lower edge 9a of the guide member 9 is situated above the upper end 6a of the bottom shell 6. In addition, the contact apparatus incorporates two baffles 10 and 11. The baffle 10 establishes a certain clearance 12 with respect to the lower end 6b of the bottom shell 6, while the baffle 11 makes a certain clearance 13 with the lower end 8a of the bottom shell piece 8. The shell pieces 7 and 8 (FIG. 2), as well as the shell 6 are shaped as cylindrical sleeves. When more than one of such overflow devices 4 are located on the base 1 they are isolated by partition plates 14 for a flow of liquid to arrange. The perforated base 1 has a receiving trough 15 (FIG. 3) spaced equidistantly between the adjacent overflow devices 4.

The contact apparatus for absorption of nitrogen oxides operates as follows.

The liquid, viz, water or a solution of weak nitric acid, located on the perforated base 1 (FIG. 1), flows towards the overflow device 4, whereas the gas, viz, nitrogen oxides, while passing through the ports 3, interacts with the liquid to form a double-phase flow. Having contacted the liquid, the gas ascends to a superjacent contact apparatus, whereas the liquid after having reached the upper end of the top shell piece 7, flows into the overflow device 4, wherein it is directed by the guide member 9, to flow into the bottom shell 6, wherefrom the liquid escapes as a flat stream (film) into the intertray column space. As the load in terms of liquid rises due to a raised liquid level in the bottom shell 6, and upon the liquid reaching the upper end 6a, it flows over into the space confined within the walls of the bottom shell 6 and of the bottom shell piece 8, whereupon the liquid flows through the clearance 13 into the intertray space as a flat stream. Thus, two parallel flows of liquid are established in the intertray space, which get in interaction with the gas ascending from a subjacent contact apparatus.

Figure 4:
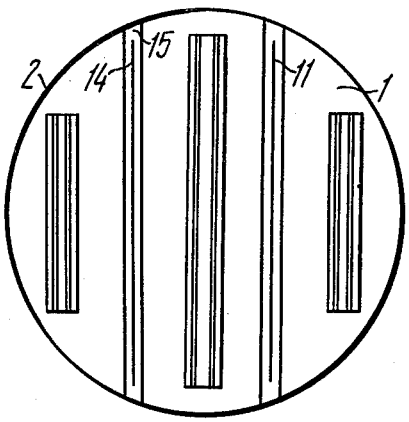
FIG. 4 is a plan view of a contact device, according to the invention, featuring three overflow devices made as rectangular ducts, the ports for gas (steam) to pass being purposely not shown.

Having reached the column shell 2 (FIGS. 2, 3, 4) or the partition plates 14, the liquid runs down onto the base 1 or into the troughs 15 (FIG. 3) which damp the velocity head of the flow of liquid and provide for a smooth getting of the letter onto the base 1, as well as contribute to a better redistribution of the liquid over the surface of the base 1. Damping of the liquid flow velocity head and a smooth getting of the liquid flow onto the base 1 result in higher operational limit of the contact apparatus in terms of liquid and in an extended range of efficient operation thereof, accordingly.

Provision of the overflow device made up by two shells 5 and 6, whereas the shell 5 in turn is composed of two shell pieces 7 and 8 interconnected through the guide member 9, establishes favourable conditions for a better deaeration of the liquid which makes it possible to increase the liquid throughput capacity of the contact apparatus and define a stable escaping of the liquid from the gaps 12 and 13.

In another embodiment in order to attain a higher liquid throughput capacity of the contact apparatus as compared to those featuring overflow devices made as cylindrical sleeves occupying the same area, the shell pieces 7 and 8 (FIG. 4) and the bottom shell 6 are shaped as rectangular ducts.

Figure 5:
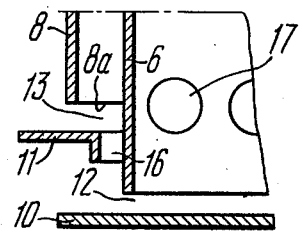
FIG. 5 is a scaled-up view of a component unit of the contact apparatus, according to the invention.

The baffle 11 (FIG. 5) makes a clearance 16 with the wall of the bottom shell 6, the amount of the clearance 16 being so selected as to provide for the liquid to get within the area of the bottom baffle 10.

The bottom shell 6 has a port 17 for the liquid to pass, said port being made in the wall of the shell 6 above the lower end 8a of the shell piece 8.

The abovesaid apparatus operates in a way similar to that described above, with the exception that the flow of liquid passing through the space confined within the wall of the shell piece 8 and that of the bottom shell 6 is split into two portions, of which one escapes from the clearance 13, while the other, from the clearance 16 to get then onto the baffle 10, thus adding to the liquid throughput capacity of the apparatus and the intensity of disintegrating of the lower flow of liquid and, correspondingly, to the efficiency of the heat-and-mass transfer. The ports 17 in the bottom shell 6 establish a hydraulic lock above the clearance 13, which prevents the gas from ingress through said clearance, thus preventing the overflow device against being blocked up by the gas flow.

The contact apparatus according to the present invention, made use of in the absorber for purifying a nitrogen-hydrogen mixture from carbon dioxide with a monoethanolamine solution, involved in ammonia production process, provided for absorber operation at a liquid load from 5 to 150 m$^3$/m$^2$ per hour and a gas flow velocity effective in the absorber cross-sectional area as calculated for the value $$f_o = W\sqrt{\gamma}$$

ux to be equal to 3.0 (kg$^{0.5}$/s·m$^{0.5}$),
where
W is the gas flow velocity in the absorber,
γ is the gas density in the absorber.
What is claimed is:

1. A contact apparatus for carrying out heat-and-mass processes running in a gas-liquid system, comprising: a perforated base having ports formed therein adapted for gas to pass therethrough; at least one liquid overflow device defining a substantially vertical liquid flow passage including a top shell having a substantially vertically extending axis fixed at its upper region to said perforated base, a bottom shell arranged coaxially with respect to said top shell, said bottom shell having an upper region which partly extends within said top shell a clearance being defined between said bottom shell upper region and said top shell, and top shell being defined by a top shell piece, the upper region thereof comprising said upper region which is fixed to said perforated base, a bottom shell piece having a smaller flow passage area than that of said top shell piece, and a guide member extending between and integrally interconnecting said top and bottom shell pieces, the lower edge of said guide member being situated above the upper end of said bottom shell, a first baffle provided under the lower end of said bottom shell piece, and a second baffle provided under the lower end of said bottom shell whereby liquid is adapted to flow from said perforated base through said overflow device by passing over the upper end of said top shell piece into said top shell whereupon it is directed by said guide member to flow into said bottom shell, the liquid discharging from said overflow device as a substantially flat stream as the same impinges on said second baffle, said clearance defined by said bottom shell upper region and said top shell into which it partly extends being adapted to provide a liquid flow passage for liquid which accumulates within and extends over the upper edge of said lower shell, any liquid passing through said liquid flow passage adapted to impinge on said first baffle.

2. A contact apparatus as claimed in claim 1, wherein said top shell piece, said bottom shell piece and said bottom shell are each constructed as a substantially cylindrical sleeve.

3. A contact apparatus as claimed in claim 2, wherein said first baffle is spaced from the lower edge of said bottom shell to define a clearance therebetween, said clearance being adapted for the liquid to pass therethrough into the area of said second baffle.

4. A contact apparatus as claimed in claim 3, wherein said bottom shell has a plurality of ports for the liquid to pass, said ports being provided in the wall of said shell above the lower end of said bottom shell piece.

5. A contact apparatus as claimed in claim 1, wherein said top shell piece, said bottom shell piece and said bottom shell are each constructed as a substantially rectangular duct.

6. A contact apparatus as claimed in claim 5, wherein said first baffle is spaced from the lower edge of said bottom shell, to define a clearance therebetween said clearance being adapted for the liquid to pass therethrough into the area of said second baffle.

7. A contact apparatus as claimed in claim 6, wherein said bottom shell has a plurality of ports for the liquid to pass, said ports being provided in the wall of said shell above the lower end of said bottom shell piece.

8. A contact apparatus for carrying out heat-and-mass processes running in a gas-liquid system, comprising: a perforated base having ports formed therein adapted for gas to pass therethrough; at least two liquid overflow devices each of said liquid overflow devices defining a substantially vertical liquid flow passage and including a top shell having a substantially vertically extending axis fixed at its upper region to said perforated base, a bottom shell arranged coaxially with respect to said top shell, said bottom shell having an upper region which partly extends within said top shell, a clearance being defined between said bottom shell upper region and said top shell, said top shell being defined by a top shell piece, the upper region thereof comprising said upper region which is fixed to said perforated base, a bottom shell piece having a smaller flow passage area than that of said top shell piece, and a guide member extending between and integrally interconnecting said top and bottom shell pieces, the lower edge of said guide member being situated above the upper end of said bottom shell, a first baffle provided under the lower end of said bottom shell piece, and a second baffle provided under the lower end of said bottom shell; partition plates adapted to subdivide said perforated base into a number of compartments, each of them accommodating one of said overflow devices; receiving troughs, each being situated under one of said partition plates and spaced substantially equidistantly between two said adjacent overflow devices; whereby liquid is adapted to flow from said perforated base through said overflow device by passing over the upper end of said top shell piece into said top shell whereupon it is directed by said guide member to flow into said bottom shell, the liquid discharging from said overflow device as a substantially flat stream as the same impinges on said second baffle, said clearance defined by said bottom shell upper region and said top shell into which it partly extends being adapted to provide a liquid flow passage for liquid which accumulates within and extends over the upper edge of said lower shell, any liquid passing through said liquid flow passage adapted to impinge on said first baffle.

* * * * *